United States Patent
Doppler et al.

(10) Patent No.: US 8,780,830 B2
(45) Date of Patent: Jul. 15, 2014

(54) INTERFERENCE SUPPRESSION DURING DEVICE-TO-DEVICE COMMUNICATIONS

(75) Inventors: Klaus Franz Doppler, Espoo (FI); Cássio Barboza Ribiero, Espoo (FI); Klaus Hugl, Helsinki (FI); Pekka Janis, Espoo (FI); Carl Simon Wijting, Espoo (FI)

(73) Assignee: Nokia Corporation, Espoo (FI)

( * ) Notice: Subject to any disclaimer, the term of this patent is extended or adjusted under 35 U.S.C. 154(b) by 382 days.

(21) Appl. No.: 13/146,064

(22) PCT Filed: Jan. 21, 2010

(86) PCT No.: PCT/IB2010/000107
§ 371 (c)(1),
(2), (4) Date: Oct. 17, 2011

(87) PCT Pub. No.: WO2010/084411
PCT Pub. Date: Jul. 29, 2010

(65) Prior Publication Data
US 2012/0099540 A1 Apr. 26, 2012

Related U.S. Application Data

(60) Provisional application No. 61/205,832, filed on Jan. 23, 2009.

(51) Int. Cl.
*H04W 4/00* (2009.01)
(52) U.S. Cl.
USPC .......................................................... 370/329
(58) Field of Classification Search
CPC ........................ H04W 72/082; H04W 52/243; H04W 28/048; H04B 15/00
USPC .......................................................... 370/329
See application file for complete search history.

(56) References Cited

U.S. PATENT DOCUMENTS

| 5,848,060 A * | 12/1998 | Dent ............................. 370/281 |
| 2005/0153659 A1* | 7/2005 | Lee et al. ................... 455/67.13 |

(Continued)

FOREIGN PATENT DOCUMENTS

WO 2008/060105 A1 5/2008

OTHER PUBLICATIONS

Stankovic et al., "Generalized Design of Multi-User MIMO Precoding Matrices", IEEE Transactions on Wireless Communications, vol. 7, No. 3, Mar. 2008, pp. 953-961.

(Continued)

*Primary Examiner* — Brandon Renner
*Assistant Examiner* — Faisal Choudhury
(74) *Attorney, Agent, or Firm* — Squire Patton Boggs (US) LLP

(57) ABSTRACT

A method is disclosed that includes selecting one or more terminals involved in a device-to-device communication to which interference caused by a transmission to one or more other terminals should be suppressed, and choosing a number of degrees of freedom from a predetermined number of degrees of freedom to be used to suppress interference towards the selected one or more terminals. The method also includes using the remaining degrees of freedom from the predetermined number to increase signal quality to the one or more other terminals and performing precoding based on the chosen number of degrees of freedom and the remaining degrees of freedom. The method further includes, using at least the performed precoding, transmitting information to the one or more other terminals. Apparatus and programs/program products are also disclosed.

19 Claims, 11 Drawing Sheets

(56) References Cited

U.S. PATENT DOCUMENTS

| | | | |
|---|---|---|---|
| 2005/0181833 A1* | 8/2005 | Lee et al. | 455/562.1 |
| 2007/0066332 A1* | 3/2007 | Zhang et al. | 455/513 |
| 2007/0232235 A1* | 10/2007 | Li et al. | 455/63.1 |
| 2009/0067530 A1* | 3/2009 | Ashikhmin | 375/267 |
| 2009/0247107 A1 | 10/2009 | Roy et al. | |
| 2010/0035600 A1* | 2/2010 | Hou et al. | 455/422.1 |
| 2010/0046491 A1* | 2/2010 | Vermani et al. | 370/342 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, v8.6.0, Sep. 2008, pp. 1-137.

"3rd Generation Partnership Project; Technical Specification Group Radio Access Network; Requirements for Further Advancements for E-UTRA (LTE-Advanced) (Release 8)", 3GPP TR 36.913, v8.0.0, Jun. 2008, pp. 1-14.

"3rd Generation Partnership Project; Technical Specification Group Radio Access Network; Evolved Universal Terrestrial Radio Access (E-UTRA); Physical Channels and Modulation (Release 8)", 3GPP TS 36.211, v8.5.0, Dec. 2008, pp. 1-82.

International Search Report and Written Opinion received for corresponding Patent Cooperation Treaty Application No. PCT/IB2010/000107, dated May 21, 2010, 14 pages.

Osseiran et al., "A MIMO framework for 4G systems: WINNER Concept and Results", IEEE 8th Workshop on Signal Processing Advances in Wireless Communications, 2007, 5 pages.

Office Action received for corresponding Chinese Application No. 201080013320.0, dated Oct. 9, 2013, 8 pages.

Office Action dated Apr. 3, 2014, issued in corresponding Chinese Patent Application No. 201080013320.0.

\* cited by examiner

INTERFERENCE SUPPRESSION DURING DEVICE-TO-DEVICE COMMUNICATIONS

RELATED APPLICATION

This application was originally filed as PCT Application No. PCT/IB2010/000107 on Jan. 21, 2010 and claims priority to U.S. Provisional Application No. 61/205832 filed Jan. 23, 2009, which is incorporated herein by reference in its entirety.

TECHNICAL FIELD

The exemplary and non-limiting embodiments of this invention relate generally to wireless communication systems, methods, devices and computer programs and, more specifically, relate to interference suppression techniques, including precoding and beamforming.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| 3GPP | third generation partnership project |
| AP | access point |
| BS | base station |
| CDF | cumulative distribution function |
| CQI | channel quality indicator |
| D2D | device to device |
| DL | downlink (BS towards UE) |
| eNB | EUTRAN Node B (evolved Node B) |
| EPC | evolved packet core |
| EUTRAN | evolved UTRAN (LTE) |
| FDD | frequency division duplex |
| FDMA | frequency division multiple access |
| LTE | long term evolution |
| MAC | medium access control |
| MM/MME | mobility management/mobility management entity |
| MSE | mean squared error |
| Node B | base station |
| OFDMA | orthogonal frequency division multiple access |
| O&M | operations and maintenance |
| PDCP | packet data convergence protocol |
| PHY | physical layer |
| RB | resource block |
| RLC | radio link control |
| RRC | radio resource control |
| SC-FDMA | single carrier, frequency division multiple access |
| SGW | serving gateway |
| SINR | signal to interference plus noise ratio |
| SISO | single input, single output |
| UE | user equipment |
| UL | uplink (UE towards eNB) |
| UTRAN | universal terrestrial radio access network |

The specification of a communication system known as evolved UTRAN (EUTRAN, also referred to as UTRAN-LTE or as EUTRA) is currently nearing completion within the 3GPP. As specified the DL access technique is OFDMA, and the UL access technique is SC-FDMA. One specification of interest is 3GPP TS 36.300, V8.6.0 (2008-September), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8).

FIG. 1 reproduces FIG. 4.1 of 3GPP TS 36.300, and shows the overall architecture of the EUTRAN system. The EUTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of the user data stream;
selection of a MME at UE attachment;
routing of User Plane data towards Serving Gateway;
scheduling and transmission of paging messages (originated from the MME);
scheduling and transmission of broadcast information (originated from the MME or O&M); and
measurement and measurement reporting configurations for providing mobility and scheduling.

The system described above may be referred to for convenience as LTE Rel 8, or simply as Rel 8. In general, the set of specifications given generally as 3GPP TS 36.xyz (e.g., 36.101, 36.211, 36.311, 36.312, etc.) may be seen as describing the entire Rel-8 LTE system.

Of particular interest herein are the further releases of 3GPP LTE targeted towards future IMT A systems, referred to herein for convenience simply as LTE-Advanced (LTE A). Reference can also be made to 3GPP TR 36.913, V8.0.0 (2008 June), 3rd Generation Partnership Project; Technical Specification Group Radio Access Network; Requirements for Further Advancements for E UTRA (LTE-Advanced) (Release 8).

LTE A will be a radio system fulfilling the ITU R requirements for IMT-Advanced while maintaining backwards compatibility with LTE Rel-8 . It may be assumed at present that single user (SU) MIMO UEs with two or four transmission antennas will be part of LTE A. There are several standards that support D2D operation in the same band as the access point/base station/central controller. However, a common assumption is that the D2D communications occur in separated resources. For example, in HiperLAN 2 (a European alternative to the IEEE 802.11 standards) if one OFDM symbol is reserved for D2D communications, then no other terminal in the same subnet is able to communicate using that OFDM symbol. This restriction ensures that there is no interference from another node in the subnet.

MIMO precoding with feedback from the UE is currently used in LTE for the purposes of enhancing the downlink connection quality and for multi-user MIMO (MU-MIMO). However, currently in LTE there is no support for D2D communications, and hence the feedback mechanisms are not suitable for interference cancellation towards a D2D receiver.

In LTE it is assumed that the UE feeds back information that allows the eNB to enhance transmissions to the corresponding UE.

Stankovic, V. and Haardt, M., in "Generalized design of multi-user MIMO precoding matrices", *IEEE Transactions on Wireless Communications,* vol. 7, no. 3, March 2008, propose a precoding scheme for multi-user MIMO applications that is divided into an interference suppression part and a SU-MIMO part. However, this approach is targeted towards MU-MIMO applications. This approach assumes that all terminals are interested in receiving data from the AP, which is not the case in D2D communications. This assumption leads to a different precoder design. Moreover, it does not consider the rank reduction of the effective channel due to receiver processing employed for the reception of the D2D transmission.

BRIEF SUMMARY

In a first aspect, a method is disclosed that includes selecting one or more terminals involved in a device-to-device communication to which interference caused by a transmission to one or more other terminals should be suppressed, and choosing a number of degrees of freedom from a predetermined number of degrees of freedom to be used to suppress interference towards the selected one or more terminals. The method also includes using the remaining degrees of freedom from the predetermined number to increase signal quality to the one or more other terminals and performing precoding based on the chosen number of degrees of freedom and the remaining degrees of freedom. The method further includes, using at least the performed precoding, transmitting information to the one or more other terminals. In another aspect, an apparatus is disclosed that includes one or more processors and one or more memories including computer program code. The one or more memory and the computer program code configured to, with the one or more processor, cause the apparatus to perform at least the following: selecting one or more terminals involved in a device-to-device communication to which interference caused by a transmission to one or more other terminals should be suppressed; choosing a number of degrees of freedom from a predetermined number of degrees of freedom to be used to suppress interference towards the selected one or more terminals; using the remaining degrees of freedom from the predetermined number to increase signal quality to the one or more other terminals; performing precoding based on the chosen number of degrees of freedom and the remaining degrees of freedom; and using at least the performed precoding, causing information to transmitted to the one or more other terminals.

In another exemplary aspect, a computer program is disclosed including code for selecting one or more terminals involved in a device-to-device communication to which interference caused by a transmission to one or more other terminals should be suppressed; code for choosing a number of degrees of freedom from a predetermined number of degrees of freedom to be used to suppress interference towards the selected one or more terminals; code for using the remaining degrees of freedom from the predetermined number to increase signal quality to the one or more other terminals; code for performing precoding based on the chosen number of degrees of freedom and the remaining degrees of freedom; and code for, using at least the performed precoding, causing information to be transmitted to the one or more other terminals, when the computer program is run on a processor.

DETAILED DESCRIPTION

In addition to the two 3GPP specifications noted in the background section, reference may also be made to 3GPP TS 36.211, V8.5.0 (2008-December), 3rd Generation Partnership Project; Technical Specification Group Radio Access Network; Evolved Universal Terrestrial Radio Access (EUTRA); Physical channels and modulation (Release 8).

D2D communication is currently one area of study, as the use of device-to-device communication enables the creation of new and useful types of services.

The exemplary embodiments of this invention provide, in one aspect thereof, a novel MIMO precoding scheme to facilitate operation of device-to-device communication on the same radio resources that another system, such as an LTE system, operates on in the same geographic area. The exemplary embodiments of this invention further provide, in another aspect thereof, a novel feedback scheme based on MIMO precoding that reduces the number of antennas needed for the MIMO precoding scheme.

Figure 1:
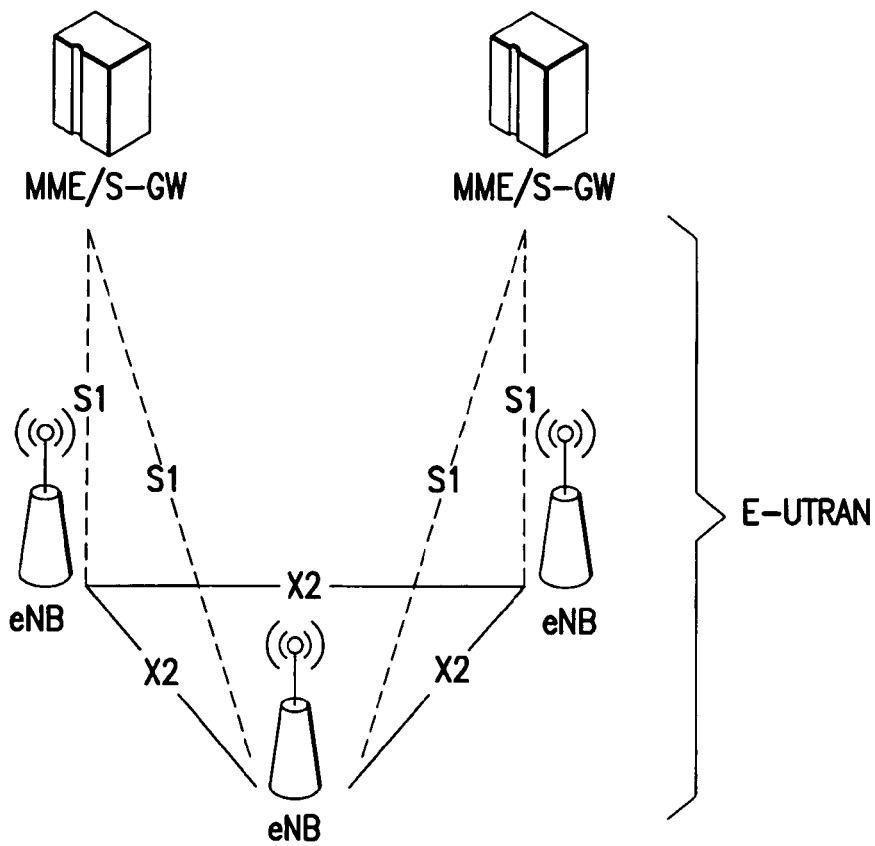
FIG. 1 reproduces FIG. 4 of 3GPP TS 36.300, and shows the overall architecture of the EUTRAN system.
Figure 2A:
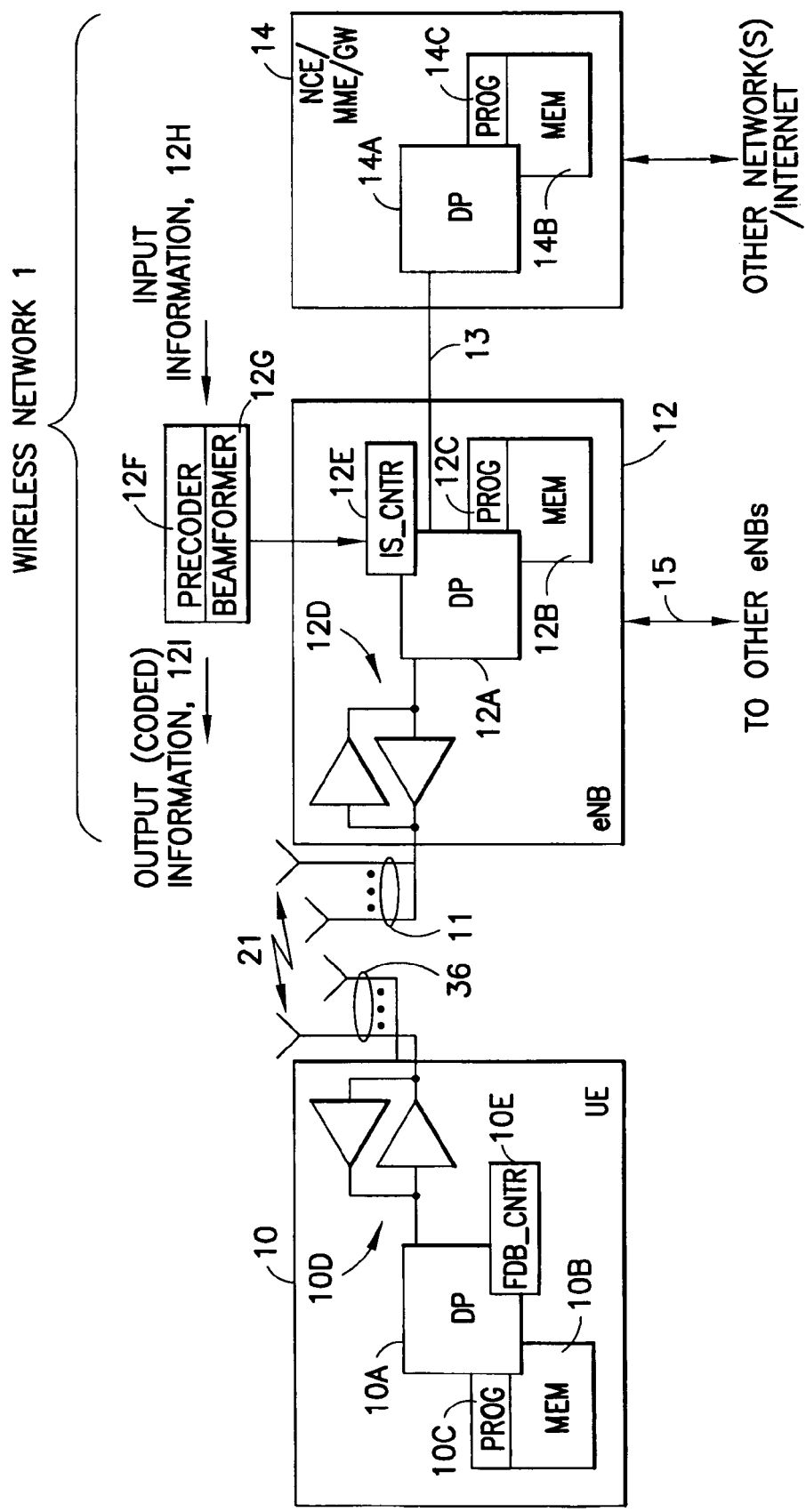
FIG. 2A shows a simplified block diagram of various electronic devices that are suitable for use in practicing the exemplary embodiments of this invention.

Before describing in further detail the exemplary embodiments of this invention, reference is made to FIG. 2A for illustrating a simplified block diagram of various electronic devices and apparatus that are suitable for use in practicing the exemplary embodiments of this invention. In FIG. 2A a wireless network 1 is adapted for communication over a wireless link 21 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1, and which provides connectivity with a further network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via a plurality of antennas 36. It may be assumed that the UE 10 includes at least two transmit antennas and possibly also at least two receive antennas.

The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via antennas 11 including at least two transmit antennas and possibly also at least two receive antennas. The eNB 12 is coupled via a data/control path 13 to the NCE 14. The path 13 may be implemented as the S1 interface shown in FIG. 1. The eNB 12 may also be coupled to another eNB via data/control path 15, which may be implemented as the X2 interface shown in FIG. 1. The NCE 14 also includes a controller, such as a computer or a data processor (DP) 14A, and a computer-readable memory medium embodied as a memory (MEM) 14B that stores a program of computer instructions (PROG) 14C.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a feedback control function (FDB_CNTR) 10E. The eNB 12 may be assumed to include an interference suppression control function (IS_CNTR) 12E that operates at least partially in response to signals received from the UE 10. The interference suppression control function 12E may be assumed to include a precoder 12F and beamformer 12G functionality as described in detail below. It is noted that the precoder 12F and beamformer 12G can be considered to be separated but cooperating entities. In another exemplary embodiment, the beamformer 12G can be considered to be a part of the precoder 12F, depending on implementation. The precoder 12F/beamformer 12G act on input information 12H to produce output (coded) information 12I.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multicore processor architectures, as non-limiting examples.

Figure 2B:
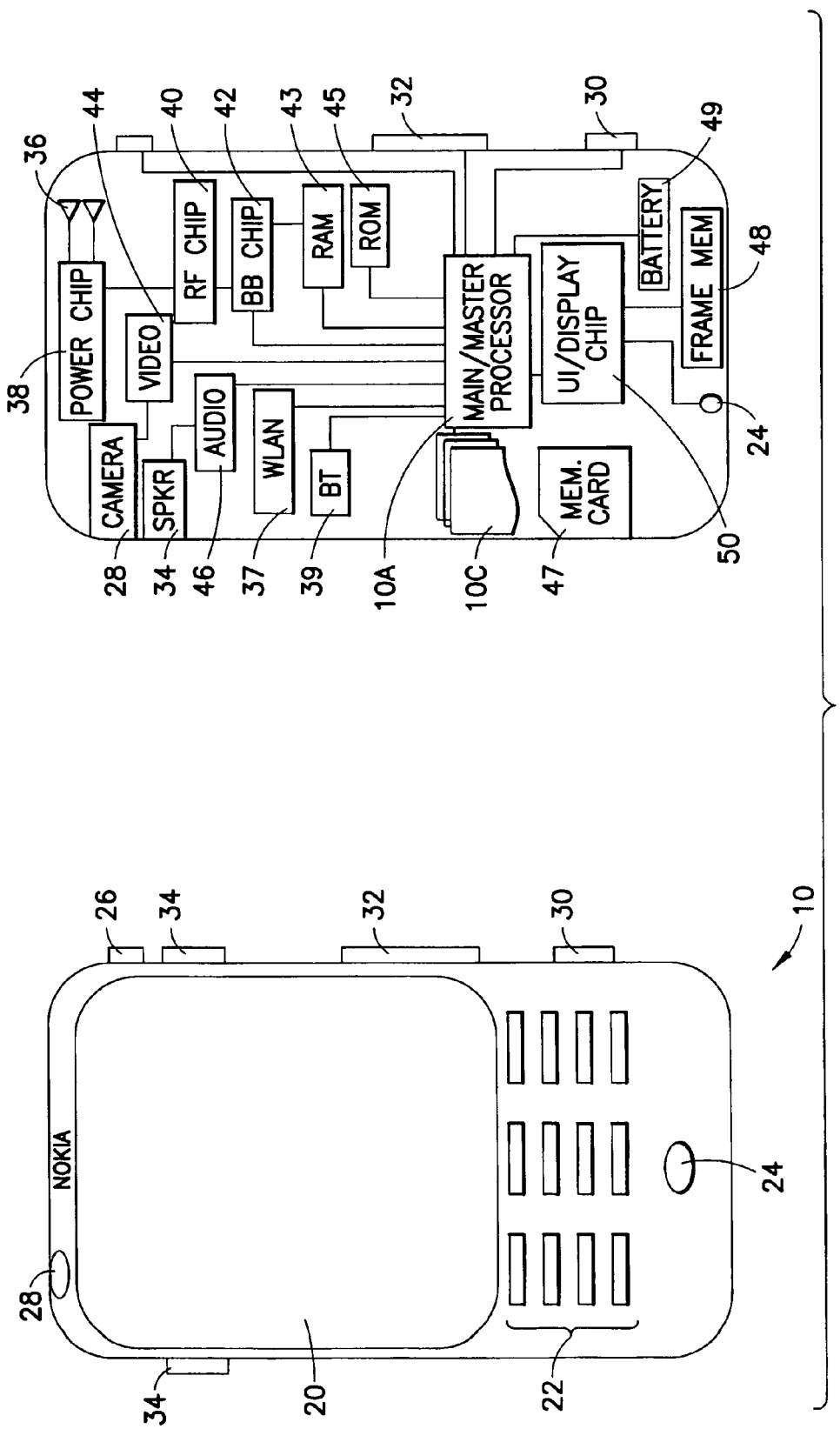
FIG. 2B shows a more particularized block diagram of a user equipment, such as that shown at FIG. 2A.

FIG. 2B illustrates further detail of an exemplary UE 10 in both plan view (left) and sectional view (right), and the invention may be embodied in one or some combination of those more function specific components. At FIG. 2B the UE 10 has a graphical display interface 20 and a user interface 22 illustrated as a keypad but understood as also encompassing touch screen technology at the graphical display interface 20 and voice recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 2B are seen the multiple transmit antennas and possibly also multiple receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio frequency (RF) chip 40 which demodulates and downconverts the signal for baseband processing. The baseband (BB) chip 42 detects the signal which is then converted to a bit stream and finally decoded. Similar processing occurs in reverse for signals generated in the apparatus 10 and transmitted from it.

Those signals that go to and from the camera 28 pass through an image/video processor 44 that encodes and decodes the image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth radio 39, which may incorporate an antenna on the chip or be coupled to an antenna off the chip. Throughout the apparatus are various memories such as random access memory RAM 43, read only memory ROM 45, and in some embodiments removable memory such as the illustrated memory card 47, on which the various programs 10C may be stored. All of these components within the UE 10 are normally powered by a portable power supply such as a battery 49.

The processors 38, 40, 42, 44, 46, 50, if embodied as separate entities in a UE 10 or eNB 12, may operate in a slave relationship to the main processor 10A, 12A, which may then be in a master relationship to them. Embodiments of this invention may be disposed across various chips and memories as shown, or disposed within another processor that combines some of the functions described above for FIG. 2B. Any or all of these various processors of FIG. 2B access one or more of the various memories, which may be on chip with the processor or separate from the processor. Similar function-specific components that are directed toward communications over a network broader than a piconet (e.g., components 36, 38, 40, 42-45 and 47) may also be disposed in exemplary embodiments of the access node 12, which may have an array of tower mounted antennas rather than the two shown at FIG. 2B.

Note that the various integrated circuits (e.g., chips 38, 40, 42, etc.) that were described above may be combined into a fewer number than described and, in a most compact case, may all be embodied physically within a single chip.

The exemplary embodiments of this invention provide a transmission arrangement for the BS 12 that optimizes DL performance in, for example, LTE Release 9 (and beyond) cells/networks.

As was noted above, the device-to-device (D2D) communication can be expected to share the same band used by the cellular network and, hence, it is desirable to coordinate the D2D communication with the cellular network. This is needed at least to enable guaranteed service levels to be offered to the users in the cellular network.

Figure 3:
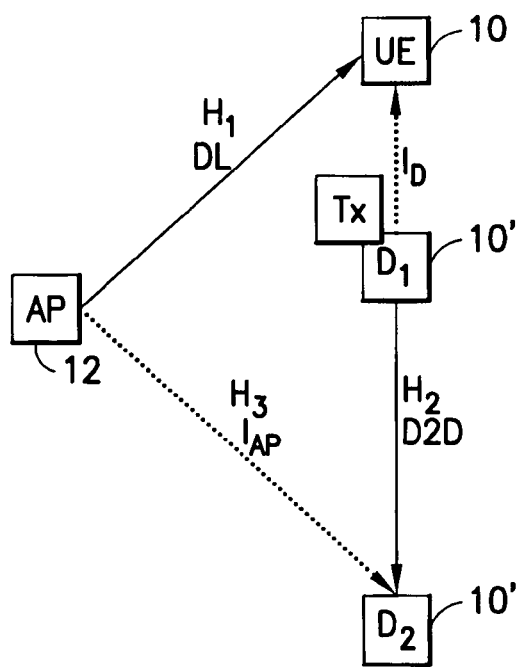
FIG. 3 shows an exemplary case where an AP transmits to a UE (downlink), while terminals D1 and D2 are engaged in D2D communications.

FIG. 3 shows an example scenario where terminals (D1, D2) are engaged in D2D communications, and a UE 10 is receiving data from the base station (eNB 12) or, more generally, from an access point (AP) 12. The D2D-capable or enabled terminals may be UEs 10 that include D2D RF communication functionality, and will be referred to hereafter for convenience as UEs 10'.

The transmission from the AP 12 to the UE 10 generates high interference for the D2D receiver D2, since the AP 12 is typically always transmitting with high power. Consequently, the D2D transmitter D1 needs to use higher power as well in order to effectively communicate with D2, thus increasing the interference that it causes to the cellular UE 10. Due to this problem it is frequently assumed that it is not feasible to share DL resources for D2D communications.

In LTE a baseline assumption is that the AP 12, UEs 10 and D2D-enabled UEs 10' are equipped with at least two antennas, and hence it is reasonable to assume that IMT-A capable devices will have at least the same baseline assumptions. As a result, in principle it is possible to apply precoding in the transmission from the AP 12 in order to prevent the interference in the direction of the D2D receiver. However, since the D2D receiver has multiple antennas as well, the AP 12 needs to use at least two degrees of freedom to cancel the interference. As a consequence, the degrees of freedom that can be used to beamform the transmission to the direction of the cellular UE 10 are reduced. For example, if the AP 12 has four Tx antennas and the UEs 10, 10' have two Rx antennas, the AP 12 would need to expend two degrees of freedom to mitigate the interference in the direction of the D2D UE 10' receiver, leaving only two degrees of freedom to design a beamforming vector for the DL transmission to the cellular UE 10.

The foregoing situation is made more complex if it is assumed that the AP 12 may not have full control over the scheduling decisions for the D2D transmissions. In particular, the AP 12 may not be aware of which of D1 and D2 is acting as the transmitter, and which is acting as the receiver. Hence, the AP 12 may need to cancel the interference in the direction of both D1 and D2, and in this case there are no degrees of freedom remaining to perform beamforming in the DL transmission to the cellular UE 10.

The exemplary embodiments of this invention address the foregoing problems by providing a technique that reduces the degrees of freedom required to cancel the interference in the direction of the D2D receiver.

The exemplary embodiments of this invention also provide a precoder 12F that takes advantage of the remaining degrees of freedom in designing a precoding matrix that enhances the DL transmission.

The exemplary embodiments of this invention provide for a reduced dimension of an interfering channel that is achieved through feedback signaling of weights used by the D2D receiver. The exemplary embodiments of this invention further provide for increased degrees of freedom to enhance the DL transmission. The exemplary embodiments of this invention also provide a precoder unit/function/algorithm (such as precoder 12F) that cancels interference in the direction of D2D receiver(s) and that also enhances DL transmission. In the ensuing description of the exemplary embodiments of this invention the following assumptions may be made:

D1 and D2 are associated with the AP 12;
the pathloss for the link between D1 and D2 is smaller than the pathloss of the link between
D2 and the AP 12, and that of the link between D1 and UE 10;
D2D transmissions share the same resources as the DL transmissions of the cellular network; and
the AP 12 and the terminals (D1, D2, and UE 10) are equipped with multiple antennas.

In accordance with one aspect of the exemplary embodiments the AP 12 applies a precoding weight that enhances the quality of its DL connection, while avoiding interference in the direction of the receiver in the D2D connection. This embodiment reduces the dimensionality of the effective channel in the direction of the D2D receiver, which provides more degrees of freedom for the AP 12 to design its precoding weights.

Consider again the communications system in FIG. 3. The downlink transmissions from the AP 12 generate harmful interference to the D2D receiver D2, denoted by $I_{AP}$. Transmissions from D1 generate interference to the UE 10 as well, denoted by $I_D$. The AP 12 is assumed to transmit with higher power, implying that interference $I_{AP}$ is strong and is capable of severely impairing D2D reception. Even though the power from the D2D transmissions can be constrained to avoid excessive interference, the location of the receiving UE 10 is unknown and, hence, the interference $I_D$ may still be very high. This is particularly relevant if the power of the D2D transmissions is made relatively high in order to compensate for the interference $I_{AP}$.

Discussed first are aspects of the exemplary embodiments of this invention that pertain to beamforming with interference suppression.

Figure 4:
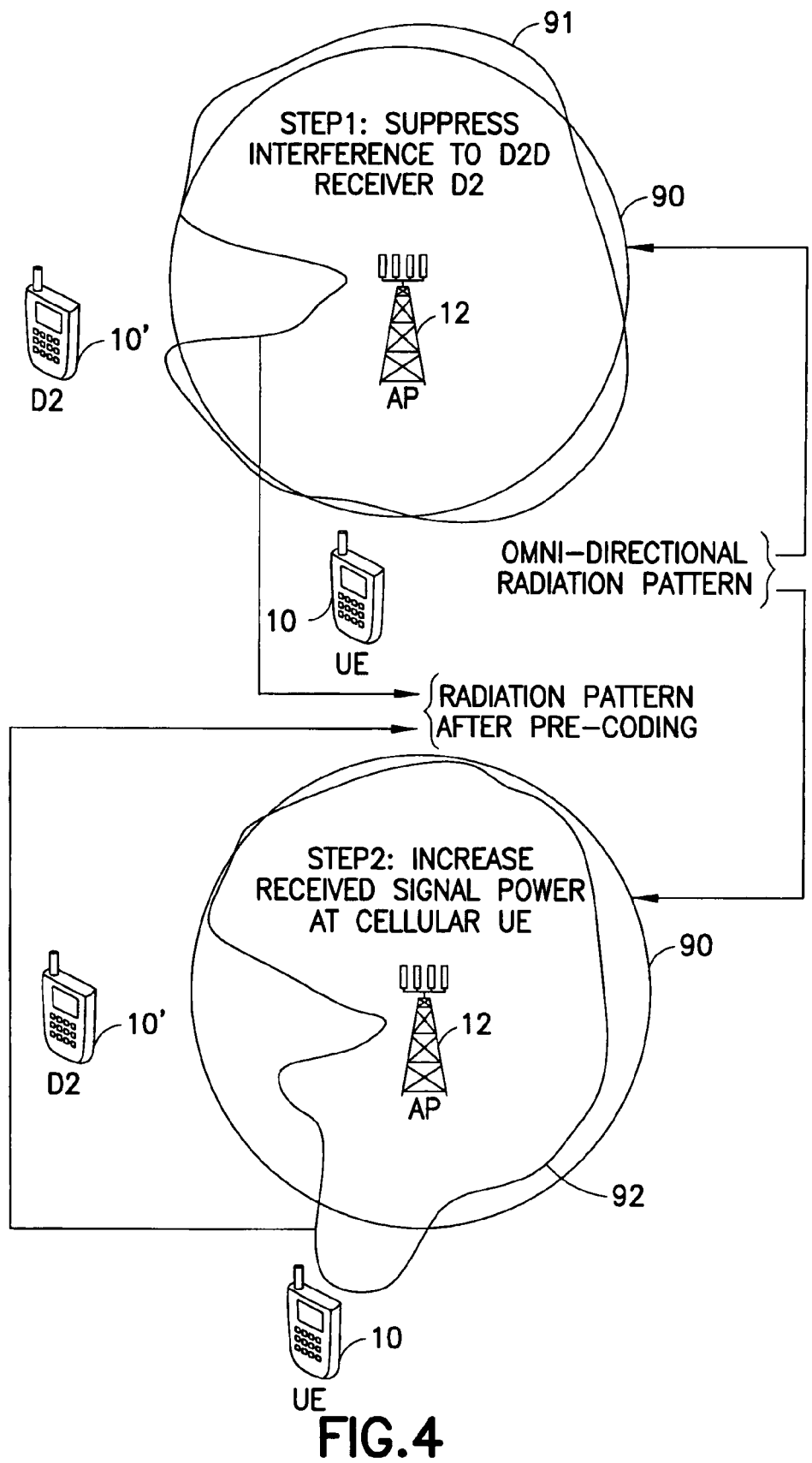
FIG. 4 illustrates the effect of a precoding procedure at the AP on the resulting transmitted radiation patterns.

Assume that the AP 12 is equipped with the multiple antennas 11 (see FIG. 2A) and that it has knowledge of the channels H1 to the UE 10 and H3 to the D2D receiver D2 (but not H2 to the D2D transmitter). Assuming that the AP 12 has a sufficient number of antennas, it is then possible to utilize a precoding matrix at the AP 12 such that the interference created in the direction of the D2D receiver D2 is reduced, leaving sufficient degrees of freedom to improve the downlink transmission to the UE 10 as well. Moreover, due to the reduced interference from the AP the D2D transmitter D1 may use lower power in order to achieve a desired connection quality, while reducing the interference it generates to the cellular UE 10. FIG. 4 illustrates the basic principle by contrasting an omni-directional radiation pattern 90 from the AP 12 with the radiation patterns 91, 92 obtained by the use of the precoding matrix. Step 1 uses some part of the degrees of freedom to suppress the interference towards the D2D receiver D2 to create the radiation pattern 91, which can be seen reduces interference with D2. Step 2 uses the remaining degrees of freedom to increase the received signal power at the cellular UE. Step 2 therefore creates radiation pattern 92, which both reduces interference with D2 and also improves reception at UE 10. These selective variations in the transmitted radiation patterns may be considered as representing beamforming operations.

It should be noted that FIG. 4 simply illustrates the basic principle, and that the resulting radiation pattern(s) may look very different than what is depicted.

Figure 5:
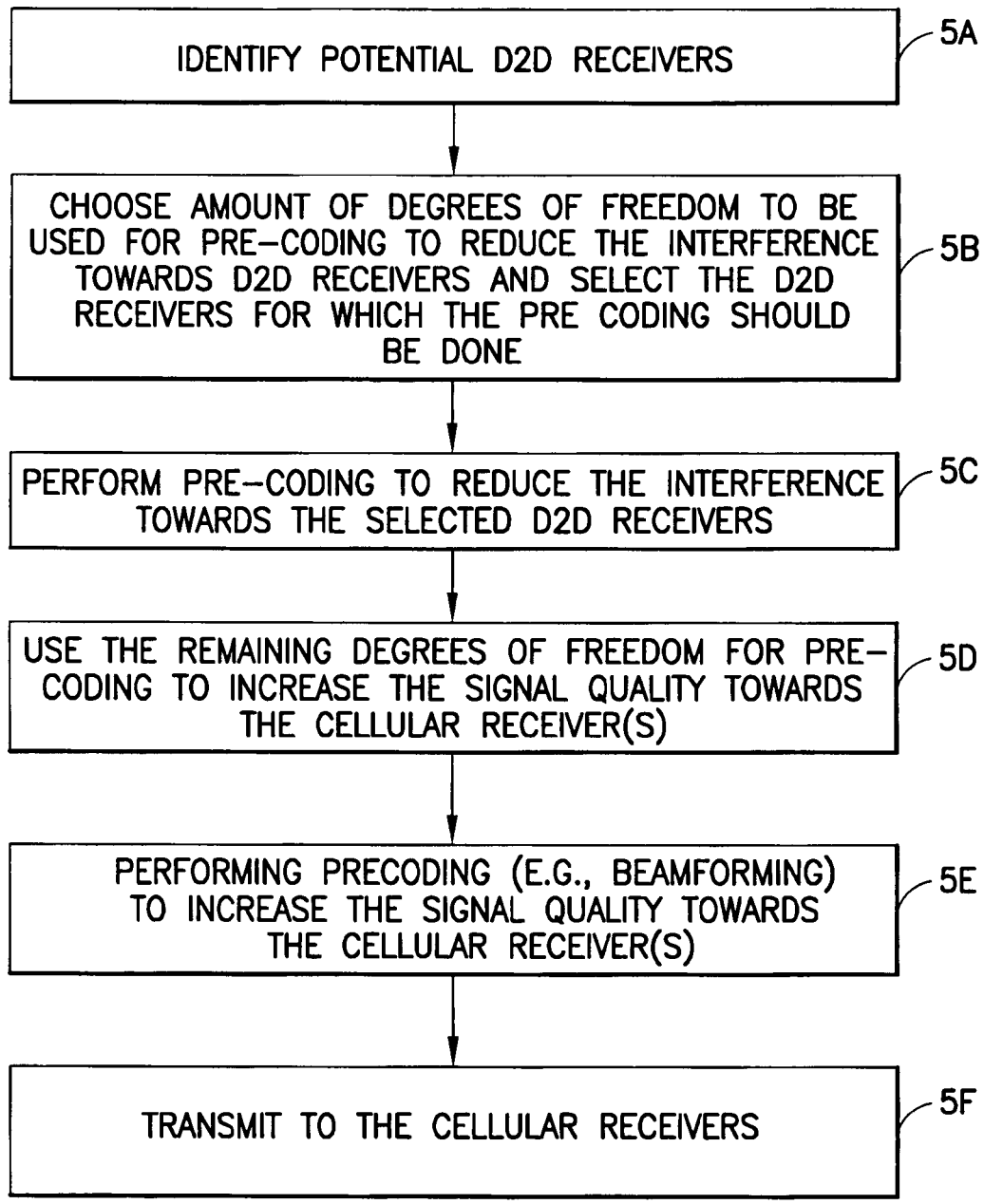
FIG. 5 is a logic flow diagram that illustrates the operation of a method, and a result of execution of computer program instructions embodied on a computer readable memory, in accordance with the exemplary embodiments of this invention, and more specifically illustrates operations performed at the AP to achieve a precoding that reduces the interference to D2D receiver(s), and that increases the signal quality towards cellular receiver(s).

A high level description of steps used to obtain the desired precoding is depicted in FIG. 5. At Block 5A the BS (AP) 12 identifies the potential D2D receiver(s) to which the interference should be suppressed. At Block 5B the BS 12 chooses the amount of degrees of freedom to be used to suppress the interference towards the D2D receivers. An example of such an algorithm is shown below. At Block 5C the AP 12 performs the precoding needed to reduce the interference towards the selected D2D receiver(s). At Block 5D the BS 12 uses the remaining degrees of freedom to increase the signal quality towards the cellular receiver(s) (UE 10). Thus, in block 5E, precoding (e.g., beamforming) is performed to increase the signal quality towards the cellular receiver(s) (UE10). In block 5F, the precoding is used to transmit to the cellular receiver(s). An example of such transmission is shown in FIG. 4. Precoding is applied to input information 12H (e.g., symbols) to produce coded output information 12I that is transmitted using antennas 11. It is noted that the block 5E can be thought of as a subset of block 5D. That is, the remaining degrees of freedom are used by precoding (e.g., beamforming) in order to increase signal quality towards the cellular receiver(s) (UE10). Block 5E merely helps to clarify the actions taken.

It is pointed out that the number of degrees of freedom $N_f$ decreases as the number of receive antennas at the D2D terminal 10' increases. Moreover, if the AP 12 is not aware of the exact scheduling among the devices in the D2D pair, it then needs to cancel the interference in the direction of both D2D terminals of the D2D pair. In general, there may be more than two D2D terminals engaged in D2D communication. In a situation where the AP 12 has four Tx antennas, and the D2D devices 10' are equipped with two RX antennas, this implies that no degrees of freedom are available for the AP 12 to design a precoder 12F that enhances the DL connection to the cellular receiver of UE 10. This in turn implies that the DL connection may in fact be degraded if interference cancellation is applied.

While it may be possible to increase the number of degrees of freedom by deliberately cancelling only part of the interference towards the D2D receivers, this approach may result in degradation of the interference cancellation.

Discussed now are aspects of the exemplary embodiments that relate to beamforming with closed-loop interference suppression.

In that the D2D terminals 10' are connected to the AP 12, they may feedback information concerning their respective AP-D2D channel(s) and used receiver weights to assist the AP 12 in determining the precoder 12F. The receiver weights are the weights used by the D2D receiver for the D2D channel H2 shown in FIG. 2. That is, the weights that are being used when a D2D terminal 10' is receiving data from a D2D terminal 10' that is transmitting. This is described in more detail below. For instance, the matrix W is described below, and this is one possible set of receiver weights.

The assistance provided to the AP 12 is particularly beneficial if the D2D connection does not fully utilize the rank of D2D channel H2. This is the case if the number of streams in the D2D connection is less than the number of receive/transmit antennas of the D2D terminals 10'. It should be noted that the AP 12 may obtain the knowledge about the AP-D2D channel without feedback, e.g., through channel reciprocity in a TDD system. The D2D terminal may, for example, transmit a probing signal where it applies the used receiver weights and the AP 12 may thus determine the equivalent channel.

The closed-loop interference suppression technique cancels the interference towards the D2D receiver subsequent to MIMO processing at the D2D receiver. For example, and assuming that the D2D communications use only single-stream transmissions, the equivalent AP-D2D channel after receiver processing may be described as a $1 \times N_t$ vector, where $N_t$ is the number of transmit antennas at the AP 12. If the AP 12 uses this equivalent channel to design the precoder 12F for interference suppression, only one degree of freedom is needed for interference cancellation, regardless of the number of receive antennas of the D2D receiver.

Figure 6A:
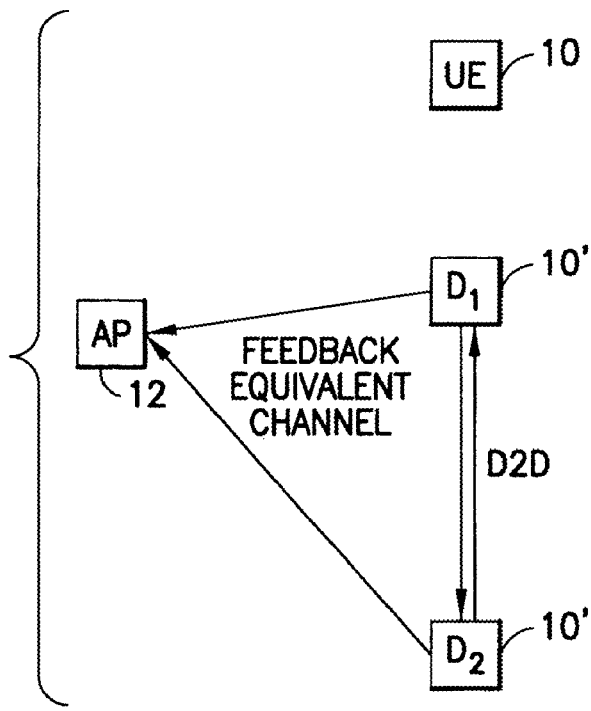
FIGS. 6A and 6B, collectively referred to as FIG. 6, illustrate closed-loop interference suppression, where in FIG. 6A D2D terminals feedback their equivalent channels to the AP, and in FIG. 6B the AP applies precoding to downlink transmission that suppresses interference towards the D2D terminals.
Figure 6B:
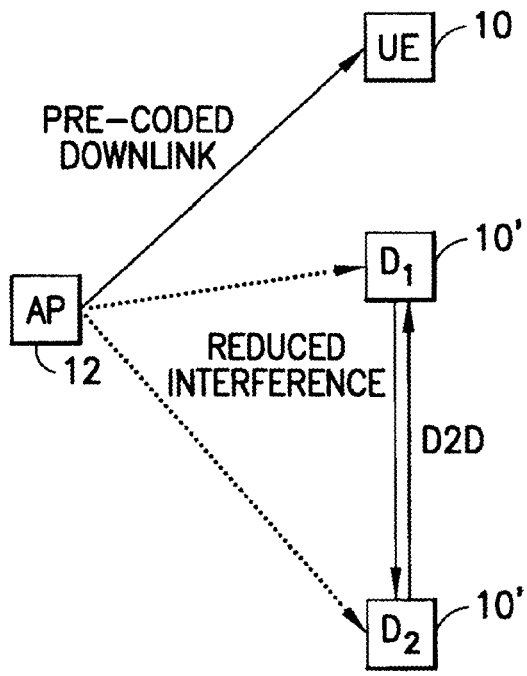

The equivalent channel is computed taking into account the channel from the AP 12 to the D2D UE 10', as well as the receiver weights for the D2D connection. Thus, D1 feeds back channel information to the AP 12 about the channel from the AP 12 to D1, and D2 feeds back channel information to the AP 12 about the channel from the AP 12 to D2. Further, the receiver weights are the weights used by the D2D receiver for the D2D channel H2. FIG. 6 illustrates this technique, where in FIG. 6A the terminals feedback to the AP 12 the equivalent channel. In FIG. 6B the AP 12 applies precoding to the downlink connection, which takes into account the equivalent channels received from the D2D terminals D1 and D2. This procedure is similar in some respects to the procedure for beamforming with interference suppression. Note, however, that the AP 12 uses the equivalent channel for the precoding, which leaves more degrees of freedom for precoding to improve the signal quality towards the cellular receiver(s) 10. This procedure is shown in the logic flow diagram of FIG. 7.

Figure 7:
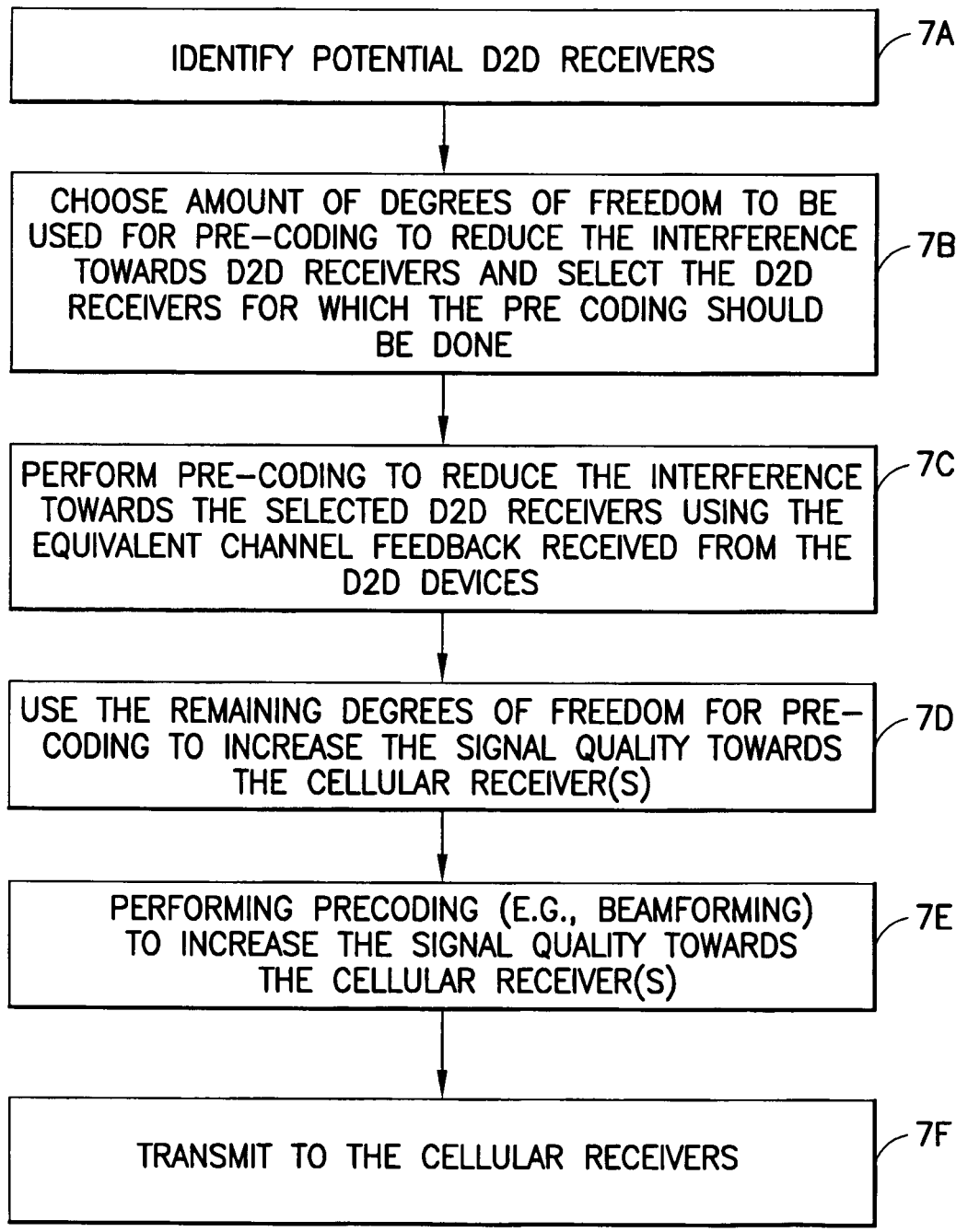
FIG. 7 is a logic flow diagram that illustrates the operation of a further method, and a result of execution of computer program instructions embodied on a computer readable memory, in accordance with the exemplary embodiments of this invention, and more specifically illustrates operations performed at the AP to use an equivalent channel for precoding, where as a consequence more degrees of freedom remain to improve the signal quality towards cellular receiver(s).

In FIG. 7, at Block 7A, the AP 12 identifies potential D2D receivers, and at Block 7B the AP 12 selects an amount of degrees of freedom to be used for the precoding to reduce the interference towards the D2D receivers, as well as selecting the D2D receivers for which the precoding is to be accomplished. At Block 7C the AP 12 performs the precoding to reduce the interference towards the selected D2D receivers using the equivalent channel feedback received from the D2D devices 10'. At Block 7D the AP 12 uses the remaining degrees of freedom for precoding to increase the signal quality towards the cellular receiver(s) (the UE(s) 10). Thus, in block 7E, precoding (e.g., beamforming) is performed to increase the signal quality towards the cellular receiver(s) (UE10). In block 7F, the precoding is used to transmit to the cellular receiver(s). An example of such transmission shown in FIG. 4.

Precoding is applied to input information 12H (e.g., symbols) to produce coded output information 12I that is transmitted using antennas 11. It is noted that the block 7E can be thought of as a subset of block 7D. That is, the remaining degrees of freedom are used by precoding (e.g., beamforming) in order to increase signal quality towards the cellular receiver(s) (UE10).

Figure 8:
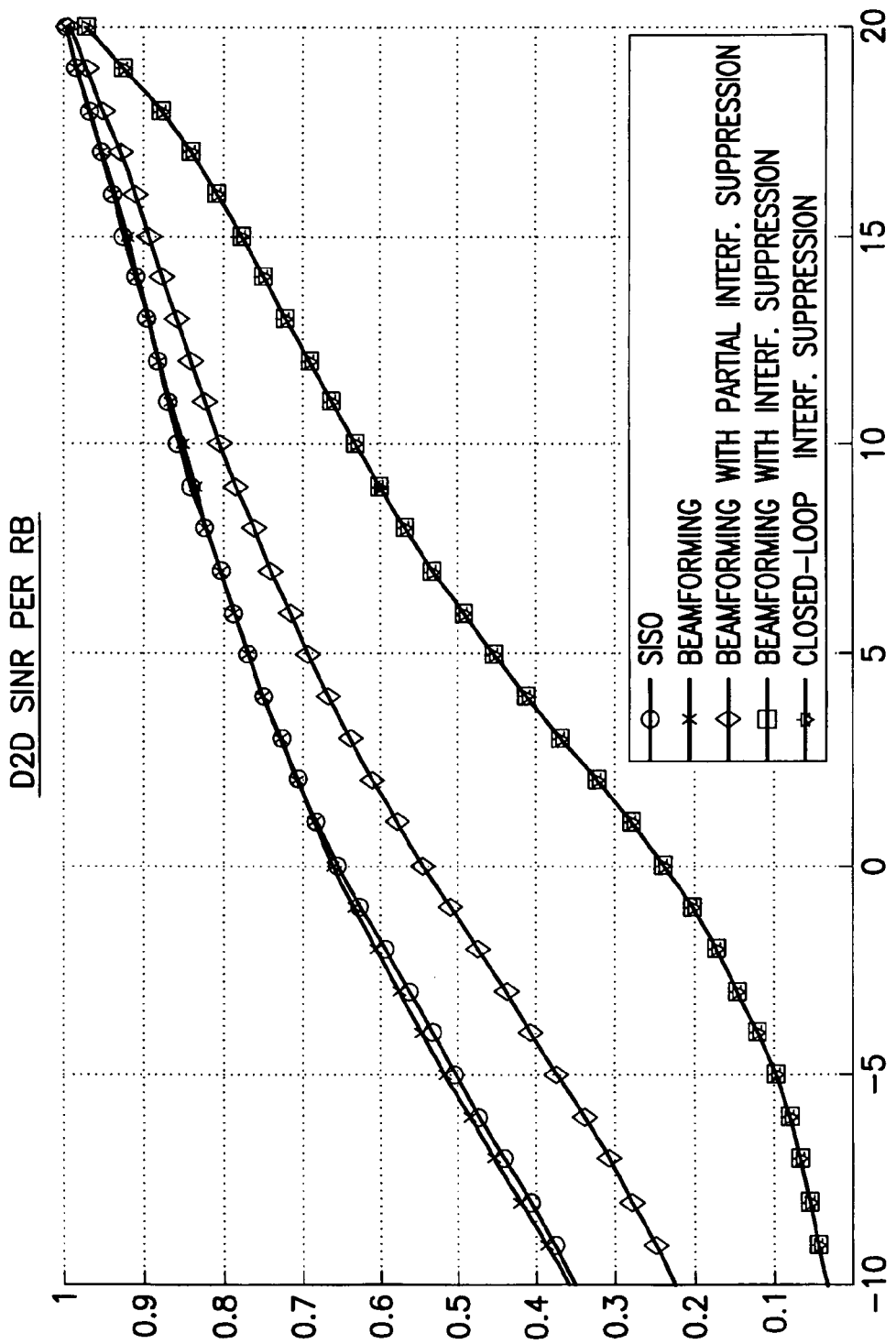
FIG. 8 is a graph showing the SINR of D2D transmissions for different precoding strategies, where curves for beamforming with interference suppression and the closed-loop interference suppression in accordance with the exemplary embodiments of this invention overlap.

FIG. 8 is a graph that depicts the SINR of D2D transmissions for different precoding strategies for a non-limiting case of four Tx antennas 11 at the AP 12 and two Rx antennas 36 at the terminals. The abscissa is in terms of D2D signal to interference plus noise ratio (SINR) per resource block (RB), and the ordinate has no units. Both the D2D link and the cellular link are assumed in this example to use single-stream transmission. The results show that by employing beamforming with closed-loop interference suppression significantly enhanced SINR values can be obtained, as compared to the use of no or only partial interference suppression.

In particular, the same performance can be obtained for two (beamforming with interference suppression) and three (beamforming with closed-loop interference suppression) degrees of freedom left for the AP 12 precoder 12F to increase the DL link quality. The gains are not so pronounced if only partial interference suppression is performed, e.g., by cancelling interference only towards the direction of the largest singular value of the channel between the AP 12 and the D2D receiver 10'. It can be shown that this closed-loop approach can provide an additional gain of approximately 7 dB over the use of only partial interference cancellation.

Figure 9:
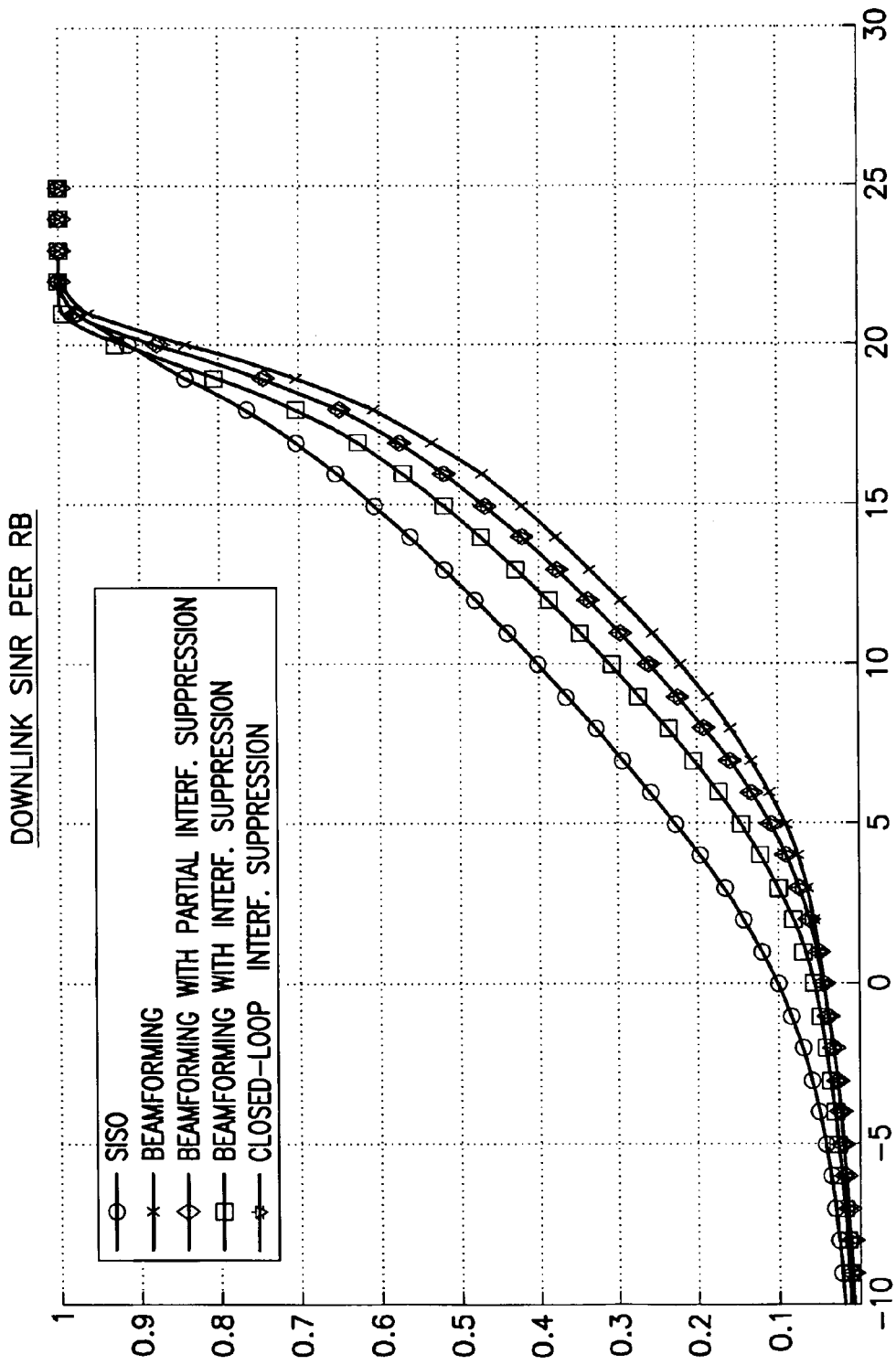
FIG. 9 is a graph showing the DL SINR for different precoding strategies, where curves for beamforming with partial interference suppression and the closed-loop interference suppression in accordance with the exemplary embodiments of this invention overlap.

It is noted that partial interference cancellation may be applied, for example, in the following scenario: four Tx antennas 11 at the AP 12, two Rx antennas 36 at the terminals 10', where the AP 12 does not have knowledge of which of the D2D devices is receiving. In this case (beamforming with interference suppression) the AP 12 cannot suppress all of the interference to the D2D devices, and it thus suppresses interference towards the largest singular value of the channel between AP 12 and D2D receiver for both D2D devices 10'. FIG. 9 shows the cellular DL SINR for different precoding strategies. It is clear from this Figure that the DL transmissions directly benefit from the additional degree of freedom in the precoder 12F. The downlink SINR CDF is improved by approximately 2 dB by the closed-loop interference suppression, as compared to the open loop interference suppression.

Figure 10:
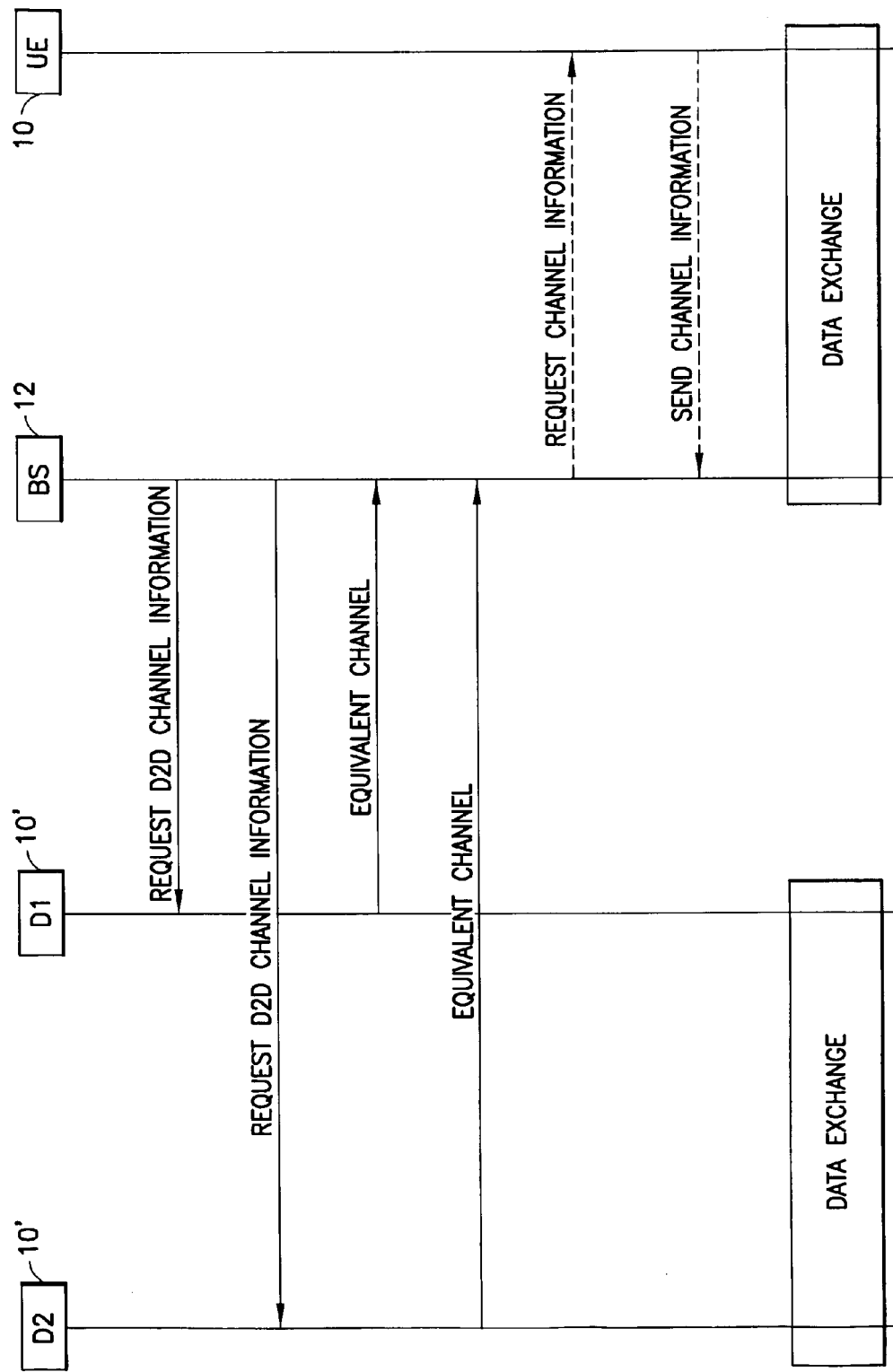
FIG. 10 illustrates an exemplary signaling exchange for acquisition of channel information by the BS (AP) from D2D and cellular terminals.

Discussed now are non-limiting embodiments of signaling for achieving closed-loop interference suppression. The exemplary embodiments of this invention as related to closed-loop interference suppression employ enhanced signaling mechanisms for implementation in a cellular communications system. FIG. 10 illustrates an exemplary signal flow. The BS 12 requires information on the equivalent channels as observed by the D2D terminals 10'. This information can be requested explicitly by the BS 12 (shown as the two separate requests in FIG. 10), or it may be transmitted periodically by the D2D terminals 10', or it may be transmitted by the D2D terminals 10' due to some event trigger, e.g., when the equivalent channel changes. The BS 12 also needs information on the channel as observed by the cellular UE 10.

This information can be requested explicitly, sent periodically by the UE 10, or else measured directly by the AP assuming it can exploit channel reciprocity. The equivalent channel feedback can use known techniques to reduce the amount of data to be signaled, e.g., signaling only changes relative to previous feedback, signaling only phase information, quantizing the information, etc. Given the information flow above shown in FIG. 10, the BS 12 is enabled to apply the precoding method described above, and that is described in further detail below.

It can be noted that feedback of the AP-to-terminal channel for two or four Tx antennas is currently specified for LTE Rel. 8 (see the above-cited 3GPP TS 36.211, V8.5.0 (2008-December), 3rd Generation Partnership Project; Technical Specification Group Radio Access Network; Evolved Universal Terrestrial Radio Access (EUTRA); Physical channels and modulation (Release 8)), and also for WiMAX. However, this particular feedback mechanism would not be generally suitable for designing the precoder 12F, since the code books in these systems are not designed for interference suppression, and as a consequence the performance degradation due to the quantization of the channel to code book entries may be unacceptably high. It is, however, within the scope of the exemplary embodiments of the invention to feedback at least one index to a code book that would approximately identify the equivalent channel, where the code book is designed and constructed (e.g., is of adequate size) so as to provide acceptable performance for interference suppression It should be noted that since the D2D devices, in many use cases of interest, will typically be stationary or very slowly moving, the signaling load will not be excessive.

During an active D2D connection the channel information is preferably updated regularly. The BS 12 may use similar signaling mechanisms to obtain the updated channel information. Discussing certain aspects of the foregoing description now in greater detail, the design of the precoding matrix may be divided into an interference cancellation part and a beamforming part. For the interference cancellation part it can be observed that the mean squared error (MSE) at the D2D receiver is minimized if the precoding vector lies in the space spanned by the singular vectors corresponding to the smallest singular values of the channel $H_3$ to the D2D receiver (see FIG. 3). That is, if the singular value decomposition (SVD) of $H_3$ is given by $$H_3 = U_3 \Sigma_3 V_3^H,$$

the MSE (mean squared error, e.g., of the symbols received at D2D terminal) at D2 is minimized by the precoding matrix given by the last $N_f$ vectors of matrix $V_3$. The value $N_f$ represents the number of degrees of freedom of the precoder design. For achieving perfect interference cancellation, $N_f$ must be smaller than or equal to the number of columns of $H_3$ minus the number of non-zero singular values of $H_3$ (e.g., for 6 Tx and 2 Rx antennas, $N_f=4$). For those use cases exhibiting small spatial correlation, such that $H_3$ is not rank-deficient, this implies that $N_f$ must be equal to the difference between the number of transmit antennas at the AP 12, $N_{tx}$, and the number of receive antennas of D2, $N_{rx}$, i.e., $N_f=N_{tx}-N_{rx}$. Such a precoding matrix $F_I$ is defined as the $N_f$ rightmost columns of matrix $V_3$, which correspond to the zero singular values $$V_3 = [F_S \ F_I],$$

and where $F_S$ denotes the signal subspace (corresponding to the non-zero singular values). The $N_f$ degrees of freedom give the AP 12 the possibility to increase the quality of the transmission over channel H1. In order to maintain the interference cancellation, the AP 12 may design a beamforming matrix used in the precoder 12F and project it onto the space spanned by the matrix $F_I$. Since the columns of $F_I$ are orthogonal with unit norm, the matrix that projects a vector onto the subspace spanned by $F_I$ is given by $$\Pi = F_I F_I^H.$$

Denote $F_B$ as the beamforming matrix for the downlink connection. The received signal at the UE (before MIMO processing) is given by $$y = H_1 \Pi F_B x + n,$$

where n denotes the receiver noise and x the transmitted signal. $F_B$ can be designed as the $N_f$ left singular vectors corresponding to the largest singular values of $H_1\Pi = \tilde{U}\tilde{\Sigma}\tilde{V}$. Finally, a final precoding matrix (implemented, e.g., by a precoder 12F) is defined as $$F = \Pi F_B.$$

Therefore, a device such as precoder 12F can choose a number of degrees of freedom to use to cancel interference in the interference cancelation portion, $\Pi$, of the final precoder matrix shown above, and then use the remaining degrees of freedom to increase signal quality to the UE 10 by using the beamforming matrix $F_B$. The beamforming matrix $F_B$ can be implemented in a beamformer 12G, and typically the precoder 12F would perform the choosing of the number of degrees of freedom applied to the interference cancellation portion and beamforming portion of F. However, the IS_CNTR 12E may also perform the choosing. Denote by $N_s$ the number of streams in the D2D transmission. Assuming D2 uses a linear receiver, the linear receiver is defined as an $N_s \times N_{rx}$ matrix W. Hence, the interference received from the AP 12 after receiver processing is given by $$y_{d2} = WH_3 Fx,$$

where F is the precoding matrix defined above. It is also noted that the matrix W is one version of receiver weights. The matrix W, is in general a function of $H_2$ and any interference or noise channel/covariance. A simple example is that W may be the Hermitian transpose of $H_2$, which gives maximum relative signal-to-noise ratio. Regardless, W can be any matrix that results in suitable performance on the D2D link.

If the D2D terminal knows both the channel $H_2$ to the D2D transmitter and the channel $H_3$ to the AP, it is able to compute W and the equivalent channel $$H_{eq} = WH_3.$$

The D2D terminal feeds back $H_{eq}$ to the AP 12 (as in FIG. 10), which uses $H_{eq}$ instead of $H_3$ for the precoder design. Note that $H_{eq}$ is simply $N_s \times N_{tx}$, while $H_3$ is $N_{rx} \times N_{tx}$. Hence, by using $H_{eq}$ the AP 12 has $N_{rx} - N_S$ additional degrees of freedom for the precoder design, which can be used to improve the DL channel quality to the cellular UE 10.

It should be noted that the foregoing beamformer designs are exemplary only, and that numerous other beamformer designs that arise from a consideration of other optimization criteria are also possible to implement.

It can also be noted that if the AP 12 knows exactly which D2D terminal 10' is receiving at a given moment in time, it can target the interference suppression towards that particular terminal. This gives more degrees of freedom to enhance the transmission to the cellular terminal (the UE 10).

It can also be noted that if the exact role of the D2D transmitter and receiver is not known, the AP 12 can suppress the interference towards both terminals 10', provided the AP 12 has a sufficient number of transmit antennas.

It can also be noted that if the exact role of the D2D transmitter and receiver is not known, but if the AP12 knows which terminal is more likely to be operating as the D2D receiver, it can suppress the interference towards this terminal.

In addition to the equivalent channel feedback from the D2D terminals, it is within the scope of the exemplary embodiments of this invention to also include as part of the feedback information the AP 12 to other interference plus noise ratio and/or a requested amount of interference suppression. This enables the AP 12 to design the precoder 12F such that the interference is only suppressed to the extent that it is no longer dominant at the D2D terminal 10', leaving additional freedom to enhance the transmission to the cellular terminal 10. With regard to the AP 12 to other interference plus noise ratio, this phrase means the received power from the AP12 (which is interference) divided by other interference plus noise power (other interference in the sense that it is interference not received from AP12). This and/or requested amount of interference suppression may be used in AP12 to decide on how much interference needs to be suppressed and/or how many degrees of freedom will be used in interference suppression.

It should be further noted that while a two step procedure for accomplishing interference suppression to the D2D receiver 10', and beamforming to the cellular receiver 10, has been described, it is within the scope of these exemplary embodiments to provide the precoding algorithm to perform both steps at once.

One clear advantage and technical effect that results from the use of the exemplary embodiments of this invention is a reduction in the degrees of freedom that the AP 12 uses to cancel interference towards the D2D receiver 10'.

Another clear advantage and technical effect that results from the use of the exemplary embodiments of this invention is that it allows for a trade-off between performance of the downlink connection and D2D link quality.

Another clear advantage and technical effect that results from the use of the exemplary embodiments of this invention is that with interference suppression the power required to achieve a given quality of service in the D2D link can be reduced. Hence, the interference from D2D transmissions to the downlink connection (to the UE 10 from the AP 12) can be reduced as well.

Note as well that multi-stream transmissions to a downlink receiver are also supported by the use of these exemplary embodiments. For example, with four transmit antennas at the AP 12, it is possible to have up to three parallel DL data streams to the UE 10 while suppressing interference to one D2D terminal UE10'.

Another clear advantage and technical effect that results from the use of the exemplary embodiments of this invention is that a combination of multi-stream transmissions to the DL receiver and interference cancellation towards several D2D receivers is supported. For example, with four transmit antennas at the AP 12, it is possible to have up to two parallel DL data streams to the UE 10 while cancelling interference towards two D2D receivers.

Based on the foregoing it should be apparent that the exemplary embodiments of this invention provide a method, apparatus and computer program(s) to provide interference suppression in a wireless communication system that includes device-to-device communications in combination with access point to device communications.

Figure 11:
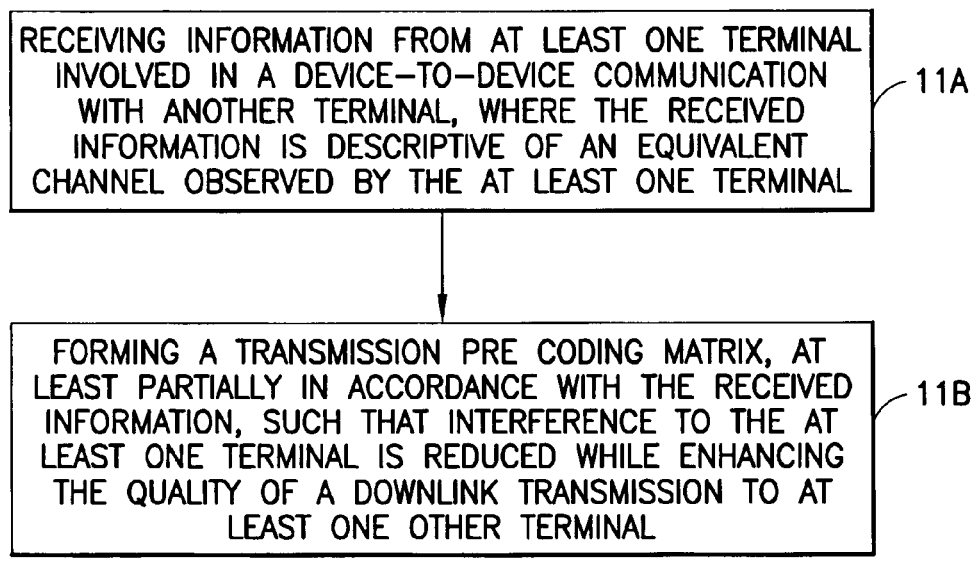
FIG. 11 is a logic flow diagram that illustrates the operation of a method, and a result of execution of computer program instructions embodied on a computer readable memory, in accordance with the exemplary embodiments of this invention.

(A) FIG. 11 is a further logic flow diagram that illustrates the operation of a method, and a result of execution of computer program instructions, in accordance with the exemplary embodiments of this invention. In accordance with these exemplary embodiments a method performs, at Block 11A, receiving information from at least one terminal involved in a device-to-device communication with another terminal, where the received information is descriptive of an equivalent channel observed by the at least one terminal. At Block 11B the method further includes forming a transmission precoding matrix, at least partially in accordance with the received information, such that interference to the at least one terminal is reduced while enhancing the quality of a downlink transmission to at least one other terminal. It is noted that this transmission precoding matrix is the matrix described above as matrix F.

(B) The method as in the preceding paragraph, where receiving receives information descriptive of the equivalent channel observed by both terminals involved in the device-to-device communication.

(C) The method as in any one of the preceding paragraphs (A) and (B), where the device-to-device communication shares at least some of the radio resources used in the downlink transmission.

(D) The method as in the preceding paragraph, where the downlink transmission is part of a cellular downlink communication.

(E) The method as in the preceding paragraph, where the downlink transmission is part of a cellular orthogonal frequency division multiple access downlink communication.

(F) The method as in any one of the preceding paragraphs, executed by an access point of a cellular communication system, where the access point and each of the terminals are equipped with a plurality of antennas.

(G) The method as in the preceding paragraph, where forming the transmission precoding matrix includes determining a number of degrees of freedom for reducing the interference to the at least one terminal, and using remaining degrees of freedom for enhancing the quality of the downlink transmission to the at least one other terminal.

(H) The method as in paragraph (F), where the access point includes a plurality of transmit antennas, and where each of the terminals includes a plurality of receive antennas.

(I) The method as in paragraph (A), where forming the transmission precoding matrix includes also using information descriptive of a channel observed by the at least one other terminal.

(J) The method as in the preceding paragraph, where information descriptive of a channel observed by the at least one other terminal is obtained by at least one of explicitly requesting the information, periodically receiving the information, and determining the information assuming channel reciprocity.

(K) The method as in paragraph (A), where the transmission precoding matrix is formed so as to reduce interference towards both terminals involved in the device-to-device communication.

(L) The method as in paragraph (A), where the transmission precoding matrix is formed so as to reduce interference towards only one of the terminals involved in the device-to-device communication, where the one terminal is known to be receiving during the device-to-device communication.

(M) The method as in paragraph (F), where the received information further includes an access point to other interference plus noise ratio.

(N) The method as in paragraph (A), where the received information further includes a requested amount of interference suppression.

A further exemplary embodiment of the invention is directed to a computer program, comprising code for selecting at least one terminal involved in a device-to-device communication to which interference caused by a transmission to at least one other terminal should be suppressed; code for choosing a number of degrees of freedom from a predetermined number of degrees of freedom to be used to suppress interference towards the selected at least one terminal; code for using the remaining degrees of freedom from the predetermined number to increase signal quality to the at least one other terminal; code for performing precoding based on the chosen number of degrees of freedom and the remaining degrees of freedom; and code for, using at least the performed precoding, causing information to be transmitted to the at least one other terminal, when the computer program is run on a processor.

Another exemplary embodiment is directed to a computer program product comprising a computer-readable medium bearing computer program code embodied therein for use with a computer, the computer program code comprising code for selecting at least one terminal involved in a device-to-device communication to which interference caused by a transmission to at least one other terminal should be suppressed; code for choosing a number of degrees of freedom from a predetermined number of degrees of freedom to be used to suppress interference towards the selected at least one terminal; code for using the remaining degrees of freedom from the predetermined number to increase signal quality to the at least one other terminal; code for performing precoding based on the chosen number of degrees of freedom and the remaining degrees of freedom; and code for, using at least the performed precoding, causing information to be transmitted to the at least one other terminal.

A further exemplary embodiment of the invention is directed to an apparatus, comprising means for selecting at least one terminal involved in a device-to-device communication to which interference caused by a transmission to at least one other terminal should be suppressed; means for choosing a number of degrees of freedom from a predetermined number of degrees of freedom to be used to suppress interference towards the selected at least one terminal; means for using the remaining degrees of freedom from the predetermined number to increase signal quality to the at least one other terminal; means for performing precoding based on the chosen number of degrees of freedom and the remaining degrees of freedom; and means for, using at least the performed precoding, causing information to be transmitted to the at least one other terminal.

The various blocks shown in FIG. 11 may be viewed as method steps executed at least in part by the interference suppression control function 12E of the AP 12, and/or as operations that result from operation of computer program code 12C of the AP 12, and/or as a plurality of coupled logic circuit elements that may form a part of the interference suppression control function 12E of the AP 12 and that are constructed to carry out the associated function(s). The exemplary embodiments of this invention also provide a terminal that is configured to transmit to an access point of a cellular communications network, while the terminal is involved in a device-to-device communication with another terminal, information that comprises an indication of an equivalent channel observed by the terminal. In these exemplary embodiments the terminal may transmit the information upon request of the access point, or periodically in an unsolicited manner.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above at least partially in the context of the EUTRAN (UTRAN-LTE) system and the LTE-A system, it should be appreciated that the exemplary embodiments of this invention are not limited for use with only these particular types of wireless communication systems, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, any names used for any described parameters are not intended to be limiting in any respect, as these parameters may be identified by any suitable names. Further, the formulas and expressions that use these various parameters may differ from those expressly disclosed herein. Also as was noted, the implementation of the exemplary embodiments of this invention is not to be construed as being limited to only the particular beamforming and/or precoding approaches discussed above.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   selecting at least one terminal involved in a device-to-device communication to which interference caused by a transmission to at least one other terminal should be suppressed;
   choosing a number of degrees of freedom from a predetermined number of degrees of freedom to be used to suppress interference towards the selected at least one terminal;
   using the remaining degrees of freedom from the predetermined number to increase signal quality to the at least one other terminal;
   performing precoding based on the chosen number of degrees of freedom and the remaining degrees of freedom; and
   using at least the performed precoding, transmitting information to the at least one other terminal,
   wherein performing precoding further comprises:
   forming an interference cancellation portion of a transmission precoding matrix based on the chosen number of degrees of freedom; and
   forming a beamforming portion of the transmission precoding matrix based on the remaining degrees of freedom.

2. The method as in claim 1 further comprising:
   receiving information from the at least one terminal, where the received information is descriptive of an equivalent channel observed by the at least one terminal in the device-to-device communication; and
   using the received information when performing at least the using of the remaining degrees of freedom from the predetermined number to increase signal quality to the at least one other terminal.

3. The method as in claim 2, wherein receiving information from the at least one terminal further comprises receiving information descriptive of the equivalent channel observed by both terminals involved in the device-to-device communication.

4. The method as in claim 2, wherein the received information further comprises an access point to other interference plus noise ratio or a requested amount of interference suppression.

5. The method as in claim 1, wherein forming the beamforming portion of the transmission precoding matrix further comprises using information descriptive of a channel observed by the at least one other terminal when forming the beamforming portion of the transmission precoding matrix.

6. The method as in claim 5, wherein information descriptive of a channel observed by the at least one other terminal is obtained by at least one of explicitly requesting the information, periodically receiving the information, and determining the information assuming channel reciprocity.

7. The method as in claim 3, wherein the precoding is performed to reduce interference towards both terminals involved in the device-to-device communication.

8. The method as in claim 1,
   wherein the precoding is performed to reduce interference towards only one of the terminals involved in the device-to-device communication, and
   wherein the one terminal is known to be receiving during the device-to-device communication.

9. The method as in claim 8, wherein the device-to-device communication shares at least some of the radio resources used in the transmission of the information to the at least one other terminal.

10. The method as in claim 9, wherein the transmission is part of a cellular downlink communication of an orthogonal frequency division multiple access system.

11. The method as in claim 10, performed by an access point of a cellular communication system, wherein the access point and each of the terminals are equipped with a plurality of antennas.

12. An apparatus comprising:
    at least one processor; and
    at least one memory including computer program code,
    wherein the at least one memory and the computer program code are configured to, with the at least one processor, cause the apparatus to perform at least the following:
    select at least one terminal involved in a device-to-device communication to which interference caused by a transmission to at least one other terminal should be suppressed;
    choose a number of degrees of freedom from a predetermined number of degrees of freedom to be used to suppress interference towards the selected at least one terminal;
    use the remaining degrees of freedom from the predetermined number to increase signal quality to the at least one other terminal;
    perform precoding based on the chosen number of degrees of freedom and the remaining degrees of freedom;
    use at least the performed precoding, causing information to be transmitted to the at least one other terminal;
    form an interference cancellation portion of a transmission precoding matrix based on the chosen number of degrees of freedom; and
    form a beamforming portion of the transmission precoding matrix based on the remaining degrees of freedom.

13. The apparatus as in claim 12, wherein the at least one memory and the computer program code are further configured to, with the at least one processor, cause the apparatus to use the received information when performing at least the using of the remaining degrees of freedom from the predetermined number to increase signal quality to the at least one other terminal, and
    wherein the received information is descriptive of an equivalent channel observed by the at least one terminal in the device-to-device communication.

14. The apparatus as in claim 12, wherein forming the beamforming portion of the transmission precoding matrix further comprises using information descriptive of a channel observed by the at least one other terminal when forming the beamforming portion of the transmission precoding matrix.

15. The apparatus as in claim 14, wherein information descriptive of a channel observed by the at least one other terminal is obtained by at least one of explicitly requesting the information, periodically receiving the information, and determining the information assuming channel reciprocity.

16. The apparatus as in claim 12,
    wherein the precoding is performed to reduce interference towards only one of the terminals involved in the device-to-device communication, and
    wherein the one terminal is known to be receiving during the device-to-device communication.

17. The apparatus as in claim 16, wherein the device-to-device communication shares at least some of the radio resources used in the transmission of the information to the at least one other terminal.

18. The apparatus as in claim 17,
    wherein the transmission is part of a cellular downlink communication,
    wherein the apparatus is an access point of a cellular communication system, and
    wherein the access point and each of the terminals are equipped with a plurality of antennas.

19. A computer program, embodied on a non-transitory computer readable medium, the computer program, when executed in hardware, performs a process comprising:
    selecting at least one terminal involved in a device-to-device communication to which interference caused by a transmission to at least one other terminal should be suppressed;
    choosing a number of degrees of freedom from a predetermined number of degrees of freedom to be used to suppress interference towards the selected at least one terminal;
    using the remaining degrees of freedom from the predetermined number to increase signal quality to the at least one other terminal;
    performing precoding based on the chosen number of degrees of freedom and the remaining degrees of freedom; and
    using at least the performed precoding, causing information to be transmitted to the at least one other terminal,
    wherein performing precoding further comprises:
    forming an interference cancellation portion of a transmission precoding matrix based on the chosen number of degrees of freedom; and
    forming a beamforming portion of the transmission precoding matrix based on the remaining degrees of freedom.

\* \* \* \* \*